US011902269B1

(12) United States Patent
Sharma et al.

(10) Patent No.: US 11,902,269 B1
(45) Date of Patent: Feb. 13, 2024

(54) SYSTEMS AND METHODS FOR REDUCING TRAFFIC RELATED TO NETWORK OPERATIONS

(71) Applicant: Capital One Services, LLC, McLean, VA (US)

(72) Inventors: Sunil Pradhan Sharma, Schaumburg, IL (US); Ravikanth Kompella, Aurora, IL (US); Rajendra Prasad Mokshagundam, Elk Grove Village, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/052,889

(22) Filed: Nov. 4, 2022

(51) Int. Cl.
*H04L 9/40* (2022.01)
*H04L 41/16* (2022.01)
*G06F 30/27* (2020.01)

(52) U.S. Cl.
CPC .......... *H04L 63/0807* (2013.01); *G06F 30/27* (2020.01); *H04L 41/16* (2013.01)

(58) Field of Classification Search
CPC ...... H04L 63/0807; H04L 41/16; G06F 30/27
See application file for complete search history.

(56) References Cited

U.S. PATENT DOCUMENTS

| 11,416,926 | B1* | 8/2022 | Showalter | G06Q 10/10 |
| 2021/0026697 | A1* | 1/2021 | Peter | G06N 20/20 |
| 2021/0083996 | A1* | 3/2021 | Moon | H04L 51/046 |
| 2023/0132703 | A1* | 5/2023 | Marsenic | H04L 63/1433 726/25 |

* cited by examiner

*Primary Examiner* — Azizul Choudhury
(74) *Attorney, Agent, or Firm* — Perkins Coie LLP

(57) ABSTRACT

In some embodiments, reducing network traffic related to network operations may be facilitated. In some embodiments, information for an operation comprising a message to authenticate the operation may be received from a client device. A machine learning model trained on information regarding a plurality of historical operation and corresponding execution result may be obtained, where the plurality of historical operations were executed on a client device of a same type as the client device. Using the machine learning model, the information for the operation may be processed to predict an execution result for authenticating the operation. The execution result may be transmitted to the client device to prevent execution of the operation in response to the execution result indicating that authenticating the operation will be unsuccessful.

20 Claims, 4 Drawing Sheets

SYSTEMS AND METHODS FOR REDUCING TRAFFIC RELATED TO NETWORK OPERATIONS

SUMMARY

In some aspects, methods and systems are described herein for reducing network traffic related to network operations. As an example, methods and systems are described herein for reducing network traffic (e.g., related to network operation authentication requests) using a machine learning model to predict execution results (e.g., for authenticating a network operation).

In the context of access tokens (e.g., hardware security tokens, hardware authentication devices, two-factor authentication devices, or other tokens), in response to a token providing token-derived information (e.g., credentials, identifying information, etc.) to an entity (e.g., a computing device, a website, a server, etc.), the token-derived information may allow a user to access services and other resources permitted with that token based on authentication of a request to access such services or other resources. In one use case, where the token is a hardware security token, a computer may provide a request for information from the token (e.g., a one-time password) related to authorizing access to the computer (e.g., logging in). The token may generate a one-time password. This password may be provided to the computer which may then transmit the password over a network (e.g., the Internet) to an authorization server to verify the password. The authorization server may then finally authorize the user to log into the computer.

However, when multiple requests are provided to the server (e.g., to verify the one-time password or other credentials), the network may be flooded with requests, which may cause network lag due to the amount of network traffic caused by the requests. Additionally, such network lag may increase authentication delays which may cause a poor user experience as users must wait as the server processes the multitude of requests. Moreover, to maintain portability of hardware security tokens, such tokens may be manufactured with a small form factor to allow a user to easily carry the token with them to enable access to resources associated with that token. Such small form factor, however, limits the amount of memory and processing resources available to be integrated in the token. This may lead to data insecurity as memory and processing intensive cryptography algorithms used to generate credentials (or other token-derived information) to enable a user access to one or more resources permitted with the token are limited by the small form factor.

To overcome this, in some embodiments, a machine learning model stored on the hardware security token may be used to predict an execution result for authenticating an operation. For example, when the execution result indicates that authenticating the operation will be unsuccessful, instead of transmitting a validation request (e.g., including the execution result) to a verification server, the system may transmit the execution result to a client device (e.g., a computing system) to prevent execution of the operation at the client device. In this way, network traffic may be reduced as a verification server is not required to verify network operations that are predicted to be unsuccessful while improving the user experience as authentication delays may be reduced.

However, storing a machine learning model on a token does not come without its own challenges. For instance, due to the memory required to train robust machine learning models and subsequently store the trained machine learning model on the token, training data may be limited to a small data set (as opposed to existing systems reliance on training machine learning models on all available training data). To accomplish this, the system may use a limited training data set comprising historical operations and corresponding execution results. To overcome any possible inaccurate predictions generated by the machine learning model trained on a small data set, the system may use a training data set based on historical operations (and corresponding execution results) that were executed on a client device of a same type as the client device (e.g., to which one or more resources are to be accessed). In this way, the system may train a robust machine learning model to generate accurate predictions related to execution results for authenticating network operations while reducing the amount of computer memory and processing resources required to train and subsequently store the machine learning model.

In some embodiments, the system may receive, from a client device, information for an operation. For example, the information for the operation may comprise a message to authenticate the operation. The system may then obtain a machine learning model trained on information regarding a plurality of historical operations and corresponding execution results, where such historical operations were executed on a client device of a same type as the client device. Using the machine learning model, the information for the operation may be processed to predict an execution result for authenticating the operation. In response to the execution result indicating that authenticating the operation will be unsuccessful, the system may transmit the execution result to the client device to prevent execution of the operation.

In some embodiments, the system may receive, from a client device, information for an operation comprising a message to authenticate the operation and a value associated with the operation. For example, the system may receive from a computer, a log in request to access resources hosted on the computer, including log in request related information, such as a message to authenticate the log in request (e.g., a request to provide token-derived credentials) and a level of network traffic (e.g., associated with an authorization network). In response to the value satisfying a predetermined threshold value, the system may obtain a machine learning model trained on information regarding a plurality of historical operations and corresponding execution results. For example, when the level of network traffic satisfies a predetermined threshold level of network traffic, the system may obtain a machine learning model configured to predict an execution result of the operation. The plurality of historical operations (and corresponding execution results) may have been executed on a client device of a same type as the client device. For example, where the computer is a laptop computer, the plurality of historical operations and corresponding execution results may have been executed on a laptop computer. Using the machine learning mode, the system may process the information for the operation to predict an execution result for authenticating the operation. For example, the system may use the machine learning model to process the log in request and the level of network traffic to predict whether authenticating the log in request will be successful or unsuccessful. In response to the execution result indicating that authenticating the operation will be unsuccessful, the system may transmit the execution result to the client device to prevent execution of the operation. For example, where the execution result indicates that authenticating the log in request will be unsuccessful, the system may transmit the execution result to the computer such that logging into the computer may be prevented.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
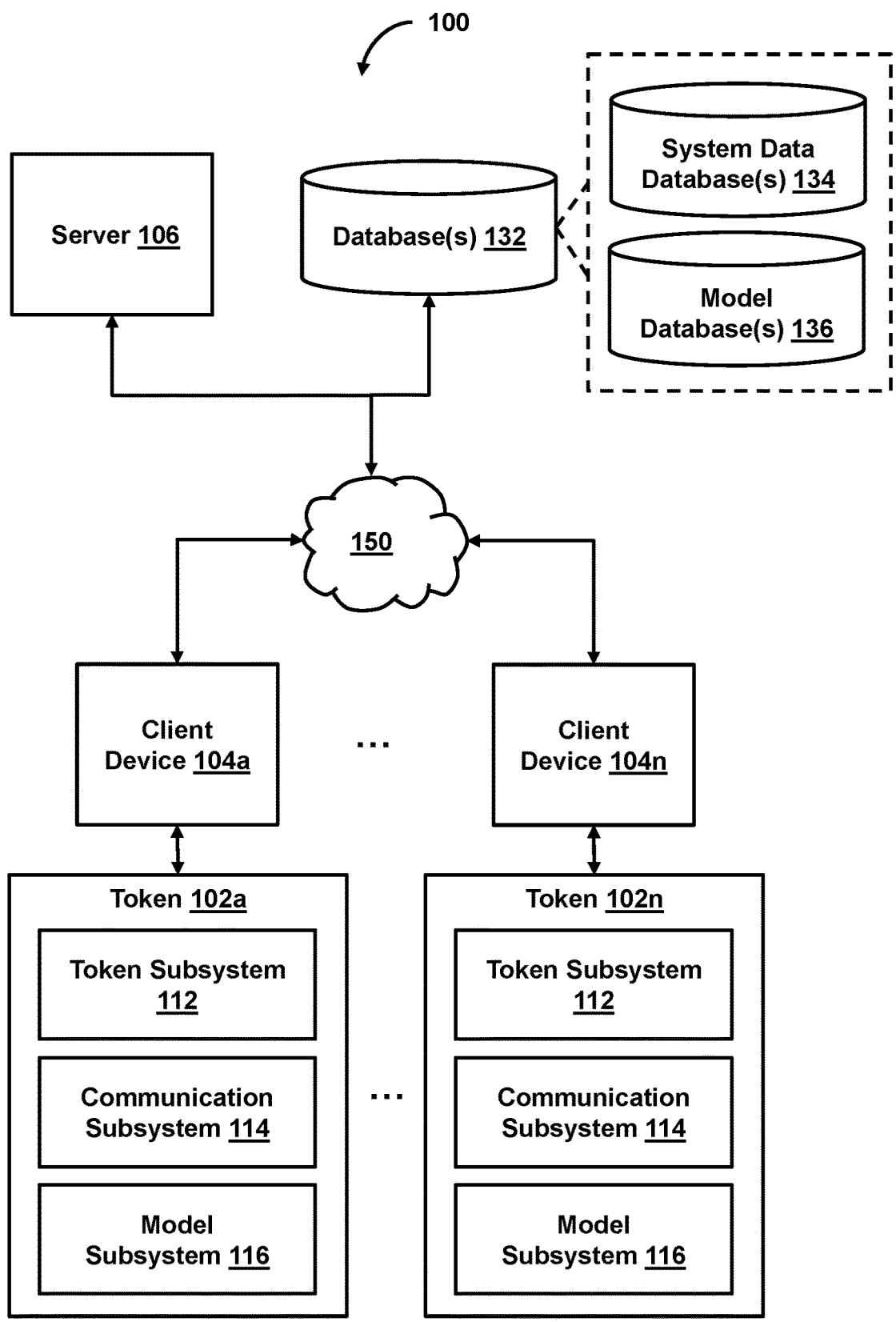
FIG. 1 shows a system for reducing network traffic related to network operations, in accordance with one or more embodiments.

FIG. 1 shows a system 100 for reducing network traffic related to network operations, in accordance with one or more embodiments. As shown in FIG. 1, system 100 may include token 102 (token(s) 102a-102n), client device 104 (or client device(s) 104a-104n), server 106, or other components. Token 102 may include token subsystem 112, communication subsystem 114, model subsystem 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more tokens 102 or client devices 104 to interact with one another, one or more servers, or other components of system 100. It should be noted that, while one or more operations are described herein as being performed by particular components of token 102, those operations may, in some embodiments, be performed by other components of token 102 or other components of system 100. As an example, while one or more operations are described herein as being performed by components of token 102, those operations may, in some embodiments, be performed by components of client device 104. As used herein, "token," "access token," "security token," and "hardware security token" may be used interchangeably unless context dictates otherwise. Additionally, it should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may reduce network traffic related to network operations. For example, network operations may include any operations that involve the use of one or more computing networks. For instance, a network operation may be a request to authenticate an action enabling access to one or more resources (logging into a computer, accessing documents, accessing items, etc.). System 100 may use a token to (i) process information for the operation and (ii) transmit an execution result (e.g., related to authenticating a network operation) to a client device to either execute or prevent execution of the operation (e.g., at the client device). In this way, by transmitting the execution result to the client device to either execute or prevent execution of the operation, the system may reduce network traffic related to authenticating the network operation as an authorization server (or other authentication service) need not validate execution of the network operation.

In some embodiments, system 100 may receive from a client device (e.g., a fixed computer system, mobile computing system, etc.) information for an operation. The information for the operation may include a message to authenticate the operation. For example, the operation may be an operation to enable a user to access one or more items, resources, or services. The system may then obtain a machine learning model trained on information regarding a plurality of historical operations and corresponding execution results. For example, the historical operations may be operations that were executed on a client device of the same type as the client device (e.g., to which the information for the operation was transmitted). For instance, as users may use the same token to provide credentials to authorize execution of operations across differing client devices, execution results (e.g., predictions related to authenticating the operation) may also differ based on the type of client device. Thus, the machine learning model may be trained on historical operations (and corresponding execution results) executed on other client devices of the same type as the client device to provide the most accurate predictions of execution results for authenticating operations.

The system may then use the machine learning model to process information for the operation to predict an execution result. For example, the execution result may be related to whether or not the operation may be authenticated. In response to the execution result indicating that authenticating the operation will be unsuccessful, the token may transmit the execution result to the client device to prevent execution of the operation. For instance, by predicting an execution result for the operation (e.g., related to whether authenticating the operation will be successful), the system may reduce network traffic and authentication delays by foregoing the automatic transmission of a validation request to a third-party authorization source as required by existing systems when authenticating the operation is predicted to be unsuccessful. Therefore, when the machine learning model predicts that authenticating the operation will be unsuccessful (e.g., due to an error in token provided credentials, a token-related error, a token-related restriction, a client device related restriction, an operation-related restriction, etc.), the operation may be prevented from execution at the client device such that the system does not waste valuable network bandwidth by transmitting execution results or validation requests to an authorization source.

Subsystems 112-116

In some embodiments, token subsystem 112 may receive information for an operation. For example, token subsystem 112 may receive a message to authenticate an operation from a client device. For instance, referring to FIG. 2, token 102 may receive the information for the operation 202 from client device 104. The operation may be an operation to enable a user to access one or more items, resources, or services via an entity (e.g., a computing system, a remote server, a remote database, a smartphone, etc.). The message may include information related to the operation, such as an identifier identifying the operation, an authentication request, a value associated with the operation, or other operation-related information. As an example, the operation may be a log in request (e.g., to log into a computer, to access one or more items hosted on a computer, etc.) and the message may include a request to authenticate the log in request (e.g., an authentication instruction, an authentication request, a request to provide credentials, etc.). The message may further include an identifier (e.g., identifying that the operation is a log in request) and may also include a value. Such value may be associated with the operation that is attempting to be executed. As an example, the value may be priority level for the operation (e.g., indicating how important the operation is to be executed), a level of network traffic (e.g., the amount of network traffic being experienced by the network to which the execution of the operation is related), a timestamp (e.g., indicating the date/time of the operation to be executed), an amount associated with the operation (e.g., an amount of bits associated with the operation, an amount of bits associated with authenticating the operation, an amount of bits associated with the response to an authentication request, etc.), a location associated with the operation (e.g., via an Internet Protocol (IP) address, Global Positioning System (GPS) coordinates, or other location-related information), an entity identifier (e.g., a name or other value indicating an entity), a device identifier (e.g., identifying a device associated with the operation, identifying a device to which the operation is to be executed, etc.).

Referring back to FIG. 1, in one use case, where token 102 is a hardware security token, client device 104 is a laptop computer, and the operation is a log in request, token subsystem 112 may receive information related to the log in request from the computer. For example, the information related to the log in request may include identifying information identifying that the operation is a log in request, a message to provide credentials to enable access to the computer (e.g., a message to authenticate the operation, such as a one-time password), and a time of day. In another use case, where token 102 is a chip card (e.g., a Europay, MasterCard®, and Visa® (EMV) chip card, or other smart card), client device 104 is a Point of Sale (PoS) device (e.g., a payment terminal, card reader, etc.), and the operation is a transaction, token subsystem 112 may receive from the PoS device, transaction-related information. For example, the transaction-related information may include a message including a payment total, a value of network traffic associated with the network (e.g., to which a validation or authorization of the transaction may occur), a date/timestamp, an identifier (e.g., identifying the merchant, identifying the type of transaction), a PoS device identifier (e.g., a serial number, device code, or other PoS identifier, etc.), a location associated with the transaction (e.g., GPS coordinates, zip code, etc.), a request to authenticate the transaction (e.g., a request to provide card details, a request to provide a personal identification number, expiration date, zip code, or card security code), or other transaction-related information.

In some embodiments, model subsystem 116 may obtain a machine learning model. For example, the machine learning model may be trained on information regarding a plurality of historical operations and corresponding execution results, where the plurality of historical operations were executed on a client device of a same type as the client device. To accurately predict execution results (e.g., of whether an operation may or may not be executed), the type of client device may be an important factor. For instance, a security token may not be compatible with a given client device due to permissions, hardware/software requirements, or other compatibility factors. As an example, a security token may be compatible with a smartphone and a laptop, but not a desktop computer. Moreover, when a user attempts to use the security token with a compatible device (e.g., the smartphone and laptop), the smartphone may execute differing operations than that of the laptop (e.g., due to the device type). As another example, where the token is an EMV chip card and the client device is a PoS device, determining whether an operation, such as a transaction, may be executed may be partly based on whether the user is attempting to complete the transaction via a physical PoS device (e.g., in a brick-and-mortar store) as opposed to a web-based interface associated with an online retailer. For instance, training the machine learning model on historical transaction data and corresponding execution results with respect to a client device of the same type may reduce fraudulent transactions and future disputes. For example, as it may be difficult to determine a fraudulent transaction via a web-based interface (e.g., as a user may purchase items from anywhere in the world), by training a machine learning model on historical transaction data and corresponding execution results with respect to a same type of client device, such as physical PoS devices, the machine learning model may be able to detect potential fraudulent transactions based on a timestamp and location of a current transaction with respect to historical transactions, corresponding execution results, and associated timestamps and location information. Thus, to avoid inaccurate predictions of whether execution of an operation may be successful or unsuccessful based on the operation alone, the machine learning model may be trained on historical operations and corresponding execution results with respect to a type of client device.

Figure 2:
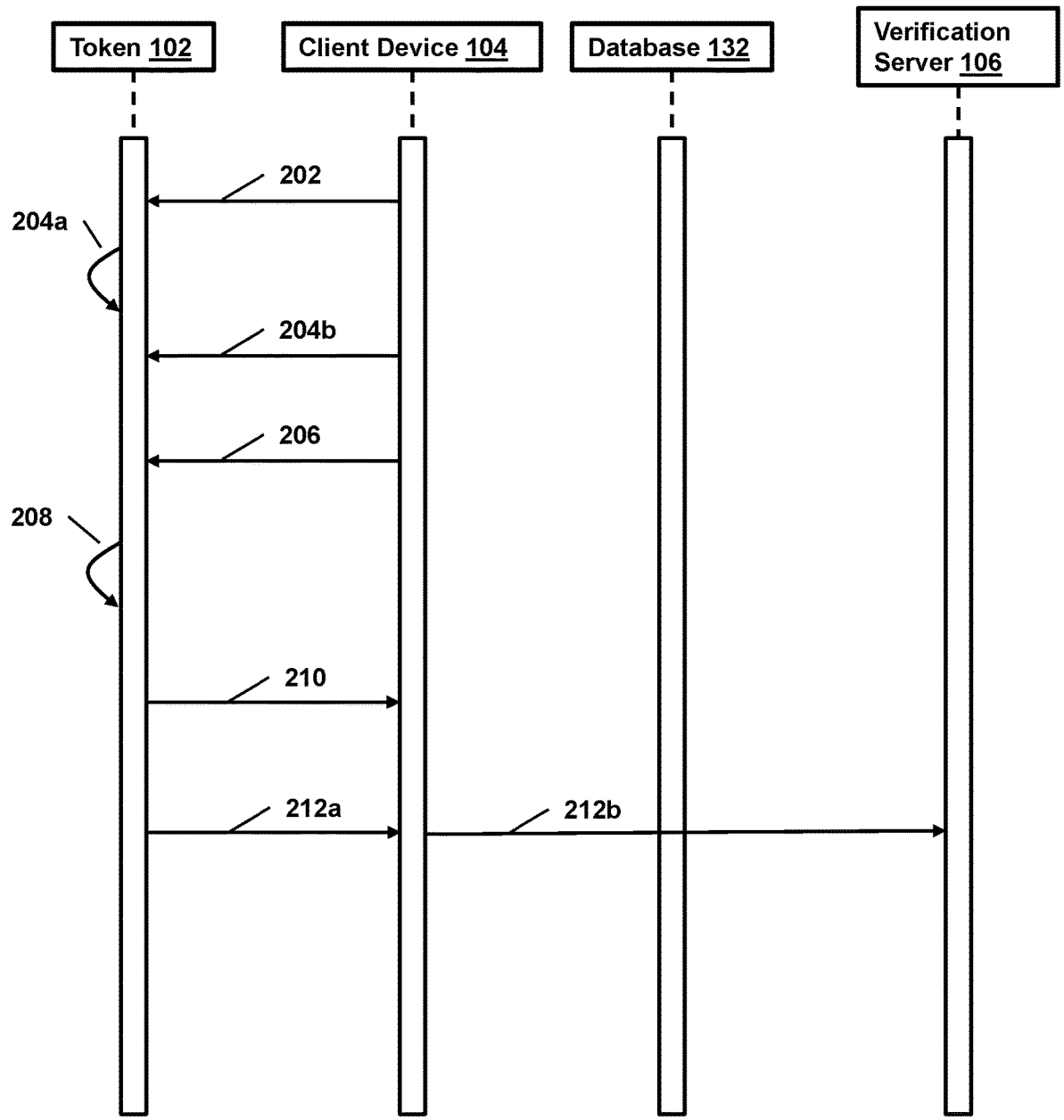
FIG. 2 shows a sequence diagram for reducing network traffic related to network operations, in accordance with one or more embodiments.

In some embodiments, model subsystem 116 may obtain one or more models configured for predicting an execution result for authenticating an operation. For example, model subsystem 116 may communicate with communication subsystem 114 to obtain one or more models from client device 104 or one or more models stored in model database 136. As an example, communication subsystem 114 may include one or more communication components for transmitting or receiving data from the client device 104 or over network 150. Such communication components may include one or more of physical connection components (e.g., ethernet, fiber optic, cable, universal serial bus (USB), or other physical connection configured for transmitting and receiving data), wireless connection components (e.g., Bluetooth®, WiFi®, Near Field Communication (NFC), or other wireless connection configured for transmitting and receiving data), etc. Referring to FIG. 2, token 102 may obtain a machine learning model 204b from client device 104 and store the machine learning model in a storage associated with model subsystem 116. Referring back to FIG. 1, machine learning models may be obtained from a database (e.g., database 132), such as models stored in model database 136. Model database 136 may store one or more prediction models which may be prediction models configured for predicting execution results for authenticating an operation, such as Neural Networks (NN), Convolutional Neural Network (CNN), Recurrent Neural Network (RNN), Support Vector Machine (SVM), Long Short-Term Memory (LSTM), deep learning model, extreme gradient boosting model, or other models. In some embodiments, token 102 may store one or more machine learning models. For example, referring to FIG. 2, model subsystem 116 may obtain a machine learning model 204a stored in token 102. By storing a machine learning model locally on the token, the system may reduce the amount of computer network traffic by foregoing obtainment of a machine learning model over a computing network (e.g., network 150).

In some embodiments, referring back to FIG. 1, model subsystem 116 may train or configure one or more prediction models to facilitate one or more embodiments described herein. In some embodiments, such models may be used to determine whether an entity satisfies entity characteristics to which the token is bound. As an example, such models may be trained or configured to perform the foregoing functions by respectively mutually mapping input data and output data in nonlinear relationships based on learning (e.g., deep learning). Additionally, one or more pre-trained prediction models may be stored in model database 136 or stored in client device 104.

In some embodiments, the prediction models may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, backpropagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 3:
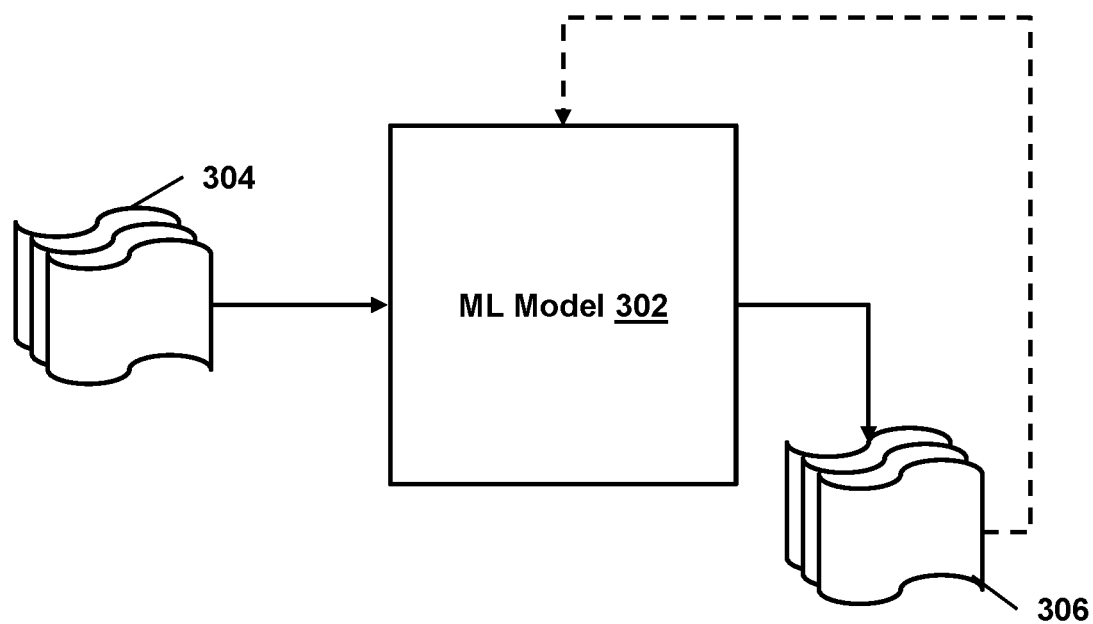
FIG. 3 shows a machine learning model configured to predict an execution result, in accordance with one or more embodiments.

As an example, with respect to FIG. 3, machine learning model 302 may take input(s) 304 and provide output(s) 306. In one use case, outputs 306 may be fed back to machine learning model 302 as input to train machine learning model 302 (e.g., alone or in conjunction with user indications of the accuracy of outputs 306, labels associated with the inputs, or with other reference feedback information). In another use case, machine learning model 302 may update its configurations (e.g., weights, biases, or other parameters) based on its assessment of its prediction (e.g., outputs 306) and reference feedback information (e.g., user indication of accuracy, reference labels, or other information). In another use case, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 302 may be trained to generate better predictions.

As an example, where the prediction models include a neural network, the neural network may include one or more input layers, hidden layers, and output layers. The input and output layers may respectively include one or more nodes, and the hidden layers may each include a plurality of nodes. When an overall neural network includes multiple portions trained for different objectives, there may or may not be input layers or output layers between the different portions. The neural network may also include different input layers to receive various input data. Also, in differing examples, data may be input to the input layer in various forms, and, in various dimensional forms, may be input to respective nodes of the input layer of the neural network. In the neural network, nodes of layers other than the output layer are connected to nodes of a subsequent layer through links for transmitting output signals or information from the current layer to the subsequent layer, for example. The number of links may correspond to the number of nodes included in the subsequent layer. For example, in adjacent fully connected layers, each node of a current layer may have a respective link to each node of the subsequent layer, noting that in some examples, such full connections may later be pruned or minimized during training or optimization. In a recurrent structure, a node of a layer may be again input to the same node or layer at a subsequent time, while in a bi-directional structure, forward and backward connections may be provided. The links are also referred to as connections or connection weights, as referring to the hardware implemented connections or the corresponding "connection weights" provided by those connections of the neural network. During training and implementation, such connections and connection weights may be selectively implemented, removed, and varied to generate or obtain a resultant neural network that is thereby trained and that may be correspondingly implemented for the trained objective, such as for any of the above exemplar recognition objectives.

In some embodiments, machine learning model 302 may be trained based on information regarding a plurality of (i) historical operations and (ii) corresponding execution results, where the historical operations (and the corresponding execution results) were executed on a client device of a same type as the client device. For example, the historical operations may be operations that were executed in the past. Such historical operations may each be associated with a corresponding execution result indicating whether a given operation was (i) executed or (ii) prevented from being executed. In some embodiments, the information regarding the plurality of historical operations may include a corresponding authentication instruction and priority value for each historical operation. In this way, machine learning model 302 may discover relationships between the historical operations, whether the historical operations were executed, and the effect that the priority value for each operation may have to predict the most accurate execution results for authenticating an operation.

As an example, machine learning model 302 may be trained on training data stored in system data database 134. For instance, model subsystem 116 may obtain training data from system data database 134 to train machine learning model 302. As an example, machine learning model 302 may take the training data as input 304, and generate a prediction indicating an execution result for authenticating an operation as output 306. For instance, input 304 may include training data including information regarding a plurality of historical operations and corresponding execution results. As another example, input 304 may additionally include a corresponding authentication instruction and priority value (e.g., with respect to each historical operation of the plurality of historical operations). In some embodiments, the generated prediction(s) may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information).

In some embodiments, machine learning model 302 may be trained remotely (e.g., remote from that of token 102). For example, model database 136 may be configured to not only store one or more machine learning models/pre-trained machine learning models, but also train machine learning models. For instance, model database 136 may obtain training data from system data database 134 to train machine learning model 302. The training data may include information regarding a plurality of (i) historical operations and (ii) corresponding execution results, where the historical operations (and the corresponding execution results) were executed on a client device of a same type as another client device (e.g., for which the remotely trained machine learning model will be transmitted to, such as token 102). Machine learning model 302 may take the training data as input 304 and generate a prediction indicating an execution result for authenticating an operation as output 306. In some embodiments, the generated outputs (e.g., outputs 306) may be fed back into machine learning model 302 to update one or more configurations (e.g., weights, biases, or other parameters) based on its assessment of its prediction (e.g., outputs 306) and reference feedback information (e.g., user indication of accuracy, reference labels, or other information). By remotely training a machine learning model from the token, the system may reduce the amount of computer memory and processing resources required at the token (e.g., token 102), thereby improving the user experience as large and cumbersome memory and processors need not be part of the token.

In some embodiments, machine learning model 302 may be used to generate a prediction indicating an execution result for authenticating an operation. For example, machine learning model 302 may be configured to receive information for an operation (e.g., a message to authenticate the operation, a value associated with the operation, etc.) to generate predictions as outputs 306 indicating an execution result for authenticating the operation (e.g., whether authenticating the operation will be successful or unsuccessful). Machine learning model 302 may process the inputs and generate a prediction related to whether authenticating the operation may be successful or unsuccessful. In this way, by using a machine learning model to generate predictions related to execution results for authenticating an operation, if the prediction indicates that authenticating the operation will be unsuccessful, the system may prevent execution of the operation at the token level (e.g., or client device level), without transmitting a validation request over a computer network for validation of/authentication of an operation. For example, as existing systems rely on remote servers to validate validation request (e.g., for executing operations, for authenticating operations, etc.), this may cause increased network traffic as each request must be validated by a remote server. Therefore, by using a machine learning model to predict execution results for authenticating operations (e.g., at the token or client device level), the system may reduce network traffic and authentication delays while improving the user experience as validation requests need not be transmitted over computing networks to authorization servers (or other resources) when authenticating the operation is predicted to be unsuccessful.

In some embodiments, where the machine learning model is an extreme gradient boosting model, the extreme gradient boosting model may be used to generate a prediction indicating an execution result for authenticating an operation. For example, an extreme gradient boosting model is a machine learning model that aggregates an ensemble of weak models to obtain an accurate strong model. For instance, extreme gradient boosting models may comprise multiple machine learning models, such as decision trees, NNs, CNNs, RNNs, SVMs, LSTMs, deep learning models, or other machine learning models. The extreme gradient boosting model may build a machine learning model (e.g., a boosted model) based on a loss function that is optimized with gradient descent using the outputs of the models which comprise the extreme gradient boosting model. For example, where an extreme gradient boosting model comprises a first decision tree model and a second decision tree model, the extreme gradient boosting model may train each of the first and second decision trees on training data, identify the errors associated with training each of the first and second decision trees, compare the errors of the first and second decision trees to a predetermined loss function, and combine the first and second decision trees in an ensemble function where the losses, when combined, produce a more accurate machine learning model (e.g., a low loss value) than that of each model considered individually. Such extreme gradient boosting model may be trained based on information regarding a plurality of historical operations and corresponding execution results (and in some embodiments, a corresponding authentication instruction and priority value) to generate better predictions related to execution results for authenticating an operation.

Referring back to FIG. 1, in some embodiments, model subsystem 116 may obtain the machine learning model in response to a value satisfying a predetermined threshold value. For instance, upon token subsystem 112 receiving the information for the operation, token subsystem 112 may determine that a value included in the information for the operation satisfies a predetermined threshold value. For example, where the value is a level of network traffic, token subsystem 112 may compare the value to a predetermined threshold value of network traffic. In some embodiments, the value may satisfy the predetermined value where the value meets or exceeds the predetermined value. For example, when the level of network traffic is higher than the predetermined level (e.g., indicating that there is a large amount of network traffic), then token subsystem 112 may communicate with model subsystem 116 to obtain the machine learning model to predict an execution result. In this way, the system may reduce network traffic by relying on a machine learning model to predict an execution result when network traffic is high, as opposed to executing the operation and/or transmitting a validation request for the operation over the network (e.g., to which a validation/authorization server may verify).

In one use case, where the token is an EMV chip card and the value is a timestamp associated with a transaction, model subsystem 116 may obtain a machine learning model in response to the timestamp satisfying a predetermined threshold timestamp. The predetermined threshold timestamp may be based on a known time at which network traffic is high for an authorization source to verify/authorize transactions. For example, after 5:00 p.m. on weekdays, people often grocery shop, thereby causing a high amount of network traffic for authorization sources to validate transactions. Token subsystem 112 may compare the timestamp associated with the transaction (e.g., the time at which the transaction is occurring) to the predetermined timestamp, and if the timestamp associated with the transaction meets or exceeds the predetermined timestamp, model subsystem 116 may obtain a machine learning model. In this way, to decrease the amount of network traffic to authorize or decline transactions, the system may obtain a machine learning model configured to predict execution results related to whether transactions may be authorized based on the time at which the transaction occurs with respect to a predetermined threshold timestamp.

In another use case, where the token is an EMV chip card and the value is an amount associated with a transaction, model subsystem 116 may obtain a machine learning model in response to the amount satisfying a predetermined threshold amount. For example, it may be advantageous to predict whether the transaction may be approved or declined based on the amount associated with the transaction (e.g., total purchase amount of the items to be purchased). For instance, the EMV chip card may be associated with a maximum purchase amount to protect the user from purchasing an item he/she cannot afford or to protect the user from nefarious uses of their chip card (e.g., card theft). Thus, token subsystem 112 may compare the amount associated with the transaction to a predetermined threshold amount (e.g., a maximum purchase amount). If the amount associated with the transaction meets or exceeds the predetermined threshold amount, model subsystem 116 may obtain a machine learning model. In this way, the system may reduce network traffic related to validating/authorizing a transaction by obtaining a machine learning model for use in predicting whether the transaction may be validated/authorized as opposed to transmitting the transaction to an authorization source.

In yet another use case, where the token is an EMV chip card, the chip card may be associated with one or more parameters. For example, the parameters may be stored in a storage associated with token subsystem 112, and may, in some embodiments, represent the predetermined threshold value. For example, the predetermined threshold value may be related to a location, region, purchase amount (e.g., max purchase amount of items or other resources), a category of merchandise (e.g., food, entertainment, automotive, home items, care products, etc.), a category of merchant (e.g., merchant category code (MCC) or other merchant category-related information), a timestamp (e.g., a time at which the card may be used, a time at which the card may not be used, etc.) or other predetermined value or parameter. As an example, where the operation is a transaction and the information related to the transaction includes a zip code, token subsystem 112 may compare the zip code to a predetermined zip code (e.g., associated with the chip card). Upon matching the zip codes, model subsystem 116 may obtain a machine learning model configured to predict execution results for authenticating an operation.

In some embodiments, the value may satisfy the predetermined threshold value where the value fails to meet or exceed the predetermined threshold value. For example, where the value is a timestamp, token subsystem 112 may compare the timestamp to a predetermined timestamp (e.g., indicating a "cut-off" time/date, a time of day that is associated with low network traffic, etc.). If the timestamp is less than the predetermined time stamp (e.g., occurring before such predetermined time), then token subsystem 112 may communicate with model subsystem 116 to obtain the machine learning model. For instance, where the information for the operation indicates that it is 5:12 p.m. and the predetermined timestamp value is 5:30 p.m., the value may satisfy the predetermined timestamp value (e.g., due to being before the predetermined timestamp value). In some embodiments, where the predetermined threshold value is a range, the value may satisfy the range when the value falls within the predetermined threshold range. For instance, where the value is a timestamp and the predetermined threshold range is a timestamp range (e.g., indicating a period of time of high network traffic), if the timestamp indicates 6:00 p.m. and the threshold timestamp range is 4:00 p.m.-9:00 p.m., token subsystem 112 may determine that the value is satisfied (e.g., as being within 4:00 p.m.-9:00 p.m.) and may communicate with model subsystem 116 to obtain the machine learning model. In other embodiments, the value may satisfy a predetermined threshold range where the value falls outside of the predetermined threshold range.

In some embodiments, model subsystem 116 may train a machine learning model. For example, model subsystem 116 may store one or more machine learning models (e.g., in one or more storages associated with token 102). In such case, communication subsystem 114 may receive from the client device, information regarding a plurality of historical operations and corresponding execution results. For example, referring to FIG. 2, token 102 may receive, via communication subsystem 114, the information regarding a plurality of historical operations (and corresponding execution results) 206 from client device 104. Referring back to FIG. 1, communication subsystem 114 may communicate with model subsystem 116 such that model subsystem 116 may train a machine learning model using the information regarding the plurality of historical operations and the corresponding execution results to generate an updated machine learning model. In this way, the token may store and locally train a machine learning model— thereby reducing network traffic, as execution results need not be predicted or authenticated by a remote server (e.g., where the authentication requests must be transmitted over one or more computing networks).

In some embodiments, model subsystem 116 may receive a subset of the plurality of historical operations. For example, system data database 134 may store information regarding historical operations and corresponding execution results that are associated with a given type of client device. For example, each historical operation used in association with a token may be associated with a type of client device via a client device identifier. A client device type may refer to a category of client device, such as whether the client device is a physical computing system, a remote computing system, a mobile computing system, the manufacturer of the client device, or other characteristic of a client device that indicates a type. Additionally, each historical operation and corresponding execution result may be associated with a token identifier (e.g., indicating that a given token provided credentials or other information to authenticate the operation). As such, to decrease the amount of computer processing and computer memory resources required to store a machine learning model on the token, model subsystem 116 may receive a subset of the plurality of historical operations and train the machine learning model using the subset of historical operations. For example, tokens often have a limited amount of computer memory available to store or process data. Therefore, it may be advantageous to store as little information on such tokens while maintaining security of such token by training a machine learning model on a subset of the most recent historical operations and corresponding execution results (e.g., as opposed to every historical operation and execution result available). In some embodiments, the subset of historical operations (and corresponding execution results) may be the most recent historical operations and corresponding execution results. For example, model subsystem 116 may receive a predetermined threshold amount of the most recent historical operations and corresponding execution results with respect to the current date/time (e.g., the latest 3, 4, 5, 10, 15, etc.) from the client device.

For example, from the historical operations and corresponding execution results stored in system data database 134, communication subsystem 114 may transmit a request (e.g., generated by token subsystem 112) for the 10 most recent historical operations and corresponding execution results. For instance, communication subsystem 114 may transmit a query to client device 104, where client device 104 may transmit the query to system data database 134. The query may indicate a request for the 10 most recent historical operations, and system data database 134 may compare a date/time associated with each historical operation (and corresponding execution results) to the current date/time to respond to the query (e.g., thereby providing the 10 most recent historical operations). The response to the query may be transmitted back to client device 104 which may then be transmitted via client device 104 to token subsystem 112. Token subsystem 112 may then communicate with model subsystem 116 and provide the most recent historical operations and corresponding execution results to model subsystem 116. In this way, by receiving the most current subset of the plurality of historical operations (e.g., to train the machine learning model), the machine learning model may be the most up-to-date while preserving valuable computer memory resources to store and train the machine learning model on the token.

In one use case, where the information regarding the plurality of historical operations represents historical log in requests (e.g., for a computer) and the token is a security token, upon token subsystem 112 receiving an authentication instruction for a current log in attempt, model subsystem 116 may receive a subset of a plurality of historical log in requests and their corresponding execution results. For instance, system data database 134 may provide the computer (e.g., to which a user is attempting to access) with the subset of the plurality of historical log in requests (and corresponding execution results) where the computer may transmit such historical log in requests and corresponding execution results to model subsystem 116. For example, the subset of the plurality of historical log in requests and corresponding execution results may be the most recent log in requests associated with (i) that computer and (ii) that token. Model subsystem 116 may then train the machine learning model (e.g., stored locally on token 102) using the subset of historical log in requests to ensure that the machine learning model is updated with the most recent historical log in requests and corresponding execution results—thereby generating more accurate predictions.

In another use case, where the information regarding the plurality of historical operations represent requests to authenticate a transaction, the corresponding execution results represent whether the corresponding transaction was approved/declined, and the token is an EMV chip card, upon token subsystem 112 receiving an authentication instruction for authorizing a current transaction, model subsystem 116 may receive a subset of a plurality of historical authentication requests and their corresponding execution results. For instance, model subsystem 116 may receive the 5 most recent historical transactions and their corresponding execution results. As EMV chip cards may be associated with a small amount of computer memory (e.g., due to the size of the EMV chip cards), preserving such computer memory may be needed. As such, by receiving a subset of a plurality of historical authentication requests and their corresponding execution results to locally train a machine learning model (e.g., stored on the EMV payment card), the system may reduce the amount of computer memory resources required to generate execution result predictions for authenticating transactions. Model subsystem 116 may then use the subset of the plurality of historical authentication requests and their corresponding exaction results to generate an updated machine learning model to predict execution results for authenticating the current transaction authentication requests.

In some embodiments, the information regarding the plurality of historical operations may include a corresponding authentication instruction and priority value for each historical operation. For instance, information regarding a historical operation may be useful when training a machine learning model to predict execution results for authenticating the operation. For example, each historical operation may be associated with an authentication instruction (e.g., to authenticate the operation) and a priority value (e.g., indicating a time of day, a level of network traffic, a location, entity identifier, etc.). Such priority value may provide an indication as to whether transmitting a validation request to a server (e.g., to validate/authenticate the operation) is appropriate, or whether using a machine learning model stored in the token is more appropriate. For example, when the priority value indicates a level of network traffic associated with an operation (e.g., a log in request), and when the level of network traffic is high, the system may determine that predicting an execution result for authenticating the operation is appropriate in lieu of transmitting a validation request to an authorization server (e.g., server 106). Therefore, using such authentication instructions and priority values associated with the plurality of historical operations to train a machine learning model may enable the machine learning model to generate more accurate predictions, which in turn may also reduce the amount of network traffic (e.g., when the execution result indicates that authenticating the operation will be unsuccessful).

In one use case, where the token is an EMV chip card, model subsystem 116 may use historical transaction information to train a machine learning model stored on the EMV chip card. For example, the historical transaction information may be a set of historical transactions where each historical transaction is associated with (i) an authentication instruction (e.g., a request to authenticate the transaction by providing card details, such as a card number, pin, or other card-related credentials), (ii) a priority value associated with the historical transaction (e.g., a time of day, a level of authorization server network traffic, an amount associated with the transaction, a location at which the location is taking place, etc.), and (iii) a corresponding execution result (e.g., whether the transaction was approved/declined). Model subsystem 116 may use such information to train a machine learning model stored on the EMV chip card to update the machine learning model. In this way, the machine learning model may generate more accurate predictions by discovering relationships between the priority value, the operation, and the execution results.

In some embodiments, model subsystem 116 may process information for the operation. For example, model subsystem 116 may process information for the operation, using a machine learning model, to predict an execution result for authenticating the operation. For example, referring to FIG. 2, model subsystem 116 may process information for the operation at the token 102, to predict an execution result 208 for authenticating the operation. The execution result may indicate a prediction that authenticating the operation will be successful or unsuccessful. For instance, a successful authentication of the operation may enable the operation to be executed, whereas an unsuccessful authentication of the operation may prevent the operation from being executed. Additionally, or alternatively, an unsuccessful authentication of the operation may cause the execution result (e.g., preventing execution of the operation) to be transmitted to a client device. In some embodiments, the machine learning model may be the updated machine learning model stored on the token, in accordance with one or more embodiments. In other embodiments, the machine learning model may be a machine learning model received from the client device, in accordance with one or more embodiments.

In some embodiments, the execution result may be transmitted. For example, in response to the execution result indicating that authenticating the operation will be unsuccessful, communication subsystem 114 may transmit the execution result to the client device to prevent execution of the operation. As an example, referring to FIG. 2, token 102 may transmit the execution result 210 to the client device 104 via communication subsystem 114. For instance, referring back to FIG. 1, when the execution result indicates that authenticating the operation will be unsuccessful, communication subsystem 114 may transmit the execution result (e.g., indicating that authenticating the operation will be unsuccessful) to the client device to prevent execution of the operation at the client device. For example, where the operation is a transaction, the token is an EMV card chip, and the client device is a PoS system, where the execution result indicates that the operation will be unsuccessful, the execution result may be transmitted to the PoS system to block the transaction (and avoiding an unnecessary transmission of the transaction information to an authorization server). In this way, the system may reduce network traffic by (i) preventing execution of the operation at the client device or (ii) preventing the transmission of a validation request indicating the execution result to a third-party authorization source.

As existing systems rely on transmitting validation requests to third-party authorization sources (e.g., to validate, verify, or otherwise authenticate) credentials provided by a token, when network traffic is high, transmitting such validation requests may increase the network traffic experienced by the network, which may lead to a poor user experience as authentication delays increase. Therefore, to avoid such authentication delays, improve the user experience, and reduce authentication delays, when the operation is predicted to be unsuccessful, the system may prevent execution of the operation at the client device as opposed to sending an unnecessary validation request to a third-party authorization source (e.g., server 106).

In some embodiments, in response to the execution result indicating that authenticating the operation will be successful, a validation request may be transmitted to the client device. For example, communication subsystem 114 may transmit a validation request to the client device to allow execution of the operation. Referring to FIG. 2, token 102 may transmit the validation request 212*a* to client device 104 via communication subsystem 114. The validation request may include (i) the execution result and (ii) an instruction to transmit the validation request to a third-party authorization source. For example, security tokens may generate credentials (e.g., one-time passwords, passcodes, or other credential-related information) to enable access to an entity (e.g., a computer). Such credentials may be validated (for authentication purposes) by a third-party authorization source, such as an authorization server. The authorization server may compare the credentials generated by the security token to the credentials generated by (or stored in) the authorization server to determine a match. Upon the matching, the authorization server may validate the authentication request and transmit an indication of validation back to the computer to allow a user access to the computer. Similarly, when the token is an EMV chip card, the EMV chip card may generate (or store) credentials used for authorizing transactions. For example, a user's card details, such as a Primary Account Number (PAN), expiration date, security code, zip code, Personal Identification number (PIN), digital signature, or other card-related details may be stored on the EMV chip. Additionally, such card details may be encoded by way of cryptographic algorithms, such as Triple Data Encryption Standard (DES), Rivest-Shamir-Adleman (RSA), or Secure Hash Algorithm (SHA) to provide authentication of the card or authenticate a transaction. To validate the transaction, the credentials (e.g., used for authorizing transactions) may be transmitted to an authorization source, where the authorization source may further validate the transaction. For example, the authorization source may compare the credentials provided by the EMV chip card to those stored (or generated) by the authorization source, thereby improving data security.

In some embodiments, in response to the execution result indicating that authenticating the operation will be successful, the token subsystem 112 may generate token-derived credentials. For example, where the token is a hardware security token and the operation is a log in request, if the execution result indicates that authenticating the operation will be successful, token subsystem 112 may generate a one-time password or other credentials to authenticate the operation (e.g., allow the user to log into a computer). As another example, where the token is an EMV chip card and the operation is a transaction, if the execution result indicates that authenticating the operation will be successful, token subsystem 112 may generate card-related credentials (e.g., a unique code corresponding to the transaction, a dynamic code corresponding to the transaction, etc.). In some embodiments, the token-derived credentials (e.g., one-time password, unique code corresponding to the operation, etc.) may be transmitted along with the execution result to a client device. For example, as discussed above, as opposed to transmitting token-derived credentials to a client device (which may then further instruct the client device to transmit the credentials to an authorization server via a validation request) when an execution result predicts that authenticating the operation will be unsuccessful, the system may reduce network traffic by transmitting token-derived credentials (which may be verified/authenticated by an authorization source or server) when the execution result indicates that authenticating the operation will be successful—thereby avoiding unnecessary validation requests to an authorization source.

In one use case, where the token is an EMV chip card, in response to the execution result indicating that authenticating a transaction will be successful, token subsystem 112 may generate a validation request. For example, the validation request may include the execution result (e.g., indicating that authenticating the transaction will be successful) and an instruction to transmit the validation request to an authorization source. For example, the authorization source may be an authorizing server (e.g., server 106) where the authorization source validates card credentials to authenticate transactions. As such, referring to FIG. 2, the validation request 212b may be transmitted to the server 106 by client device 104. In some embodiments, the validation request may also include transaction-related information (e.g., an amount, a merchant name, a timestamp, a date, etc.). Upon token subsystem 112 generating the validation request, communication subsystem 114 may transmit the validation request to the client device (e.g., a PoS terminal). As the validation request includes an instruction to transmit the validation request to an authorization source, the client device may transmit the validation request, the execution result, the transaction details, or the card credentials to the authorization source for further validation. In this way, the system may preserve data security by validating transactions via an authorization server.

Example Flowchart

Figure 4:
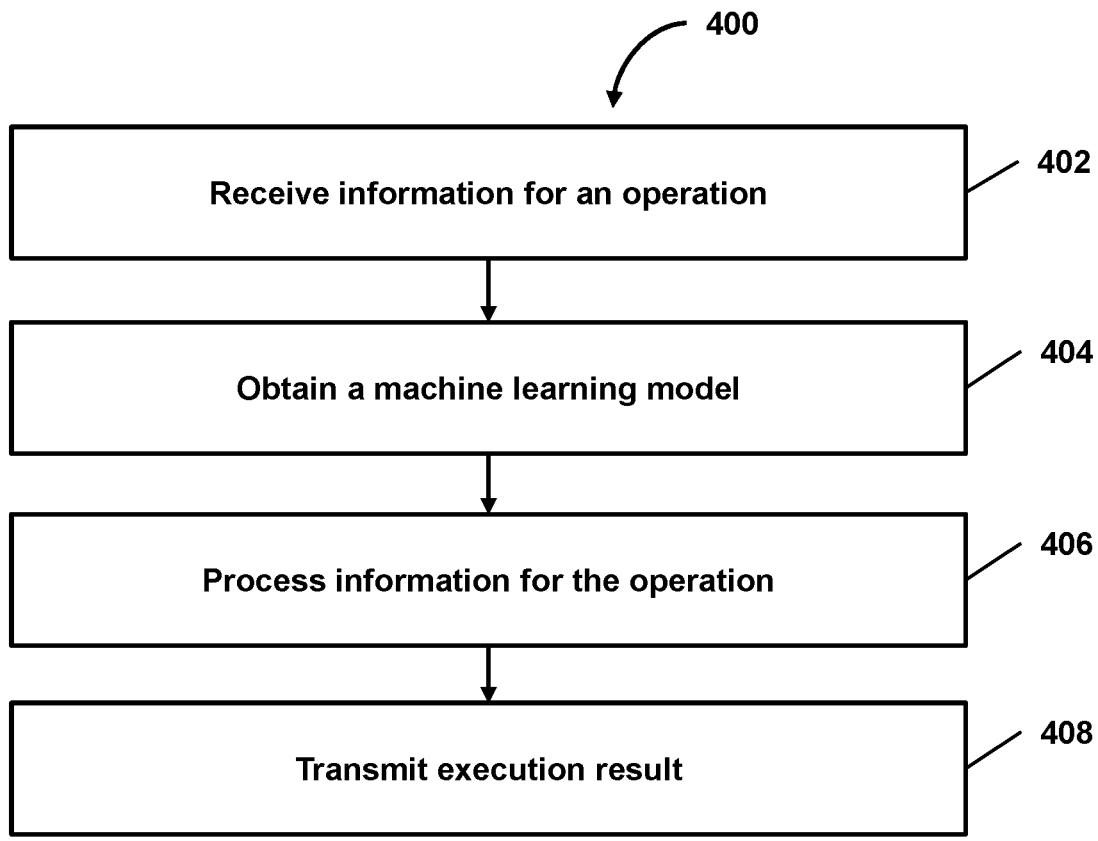
FIG. 4 shows a flowchart of a method for reducing network traffic related to network operations, in accordance with one or more embodiments.

FIG. 4 is an example flowchart of processing operations of a method 400 that enable the various features and functionality of the system as described in detail above. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

In an operation 402, information for an operation may be received. For example, information for an operation comprising a message to authenticate the operation and a value associated with the operation may be received from a client device. For instance, the operation may be a log in request (e.g., to access one or more resources of a computer) and may include information related to the log in request, such as a message to authenticate the operation (e.g., an authentication request requesting credentials or other authenticating information, such as a one-time password). The value may be a value that is associated with the operation. For example, where the operation is a log in request, the value may be a timestamp or level of network traffic. As another example, where the operation is a transaction and the token is an EMV chip card, the information for the transaction may include a message to provide card credentials to authenticate the transaction and may include an amount associated with the transaction. Operation 402 may be performed by a subsystem that is the same as or similar to token subsystem 112, in accordance with one or more embodiments.

In an operation 404, a machine learning model may be obtained. For example, in response to the value satisfying a predetermined threshold value, a machine learning model trained on information regarding a plurality of historical operations and corresponding execution results may be obtained. For instance, where the value is a level of network traffic and the token is a security token, in response to the level of network traffic meeting or exceeding a maximum level of network traffic, a machine learning model configured to predict execution results for authenticating operations may be obtained. As another example, where the value is an amount associated with a transaction and the token is an EMV chip card, in response to the amount meeting or exceeding a predetermined purchase amount (e.g., a maximum purchase amount), the machine learning model may be obtained. In some embodiments, the plurality of historical operations may be historical operations that were executed on a client device of a same type as the client device. For example, in the context of EMV chip cards, one may attempt to conduct a transaction via a web-based merchant or via a brick-and-mortar merchant. To help reduce potential fraudulent use of the EMV chip card, it may be advantageous to use a machine learning model trained on historical transaction data that were executed on a PoS system (as opposed to historical transaction data that were executed via a web-based interface). For instance, where the value is a location associated with the transaction, in response to the value satisfying a predetermined location, a machine learning model may be obtained to predict an execution result related to authenticating the operation (e.g., such that a transaction may be approved or declined based on the location of the transaction). For example, where a user normally makes purchases in one location and the current transaction to be authenticated is determined to occur at an unusual location (e.g., a far-away location, a location more than 100 miles away (or other value) from an average of historical locations, etc.), the system may prevent fraudulent transactions from occurring. Operation 404 may be performed by a subsystem that is the same as or similar to model subsystem 116, in accordance with one or more embodiments.

In an operation 406, information for the operation may be processed. For example, information for the operation may be processed, using the machine learning mode, to predict an execution result for authenticating the operation. For instance, the execution result may indicate whether authenticating the operation is predicted to be successful or unsuccessful. For example, in the context of EMV chip cards, by using a machine learning model to predict an execution result for authenticating a transaction, the machine learning model may predict that the transaction may be a fraudulent transaction and may predict that attempting to authenticate the transaction (e.g., by providing card details, a card number, PAN, or other card-related credentials) may prove to be unsuccessful due to the transaction being fraudulent. Operation 406 may be performed by a subsystem that is the same as or similar to model subsystem 116, in accordance with one or more embodiments.

In an operation 408, an execution result may be transmitted. For example, in response to the execution result indicating that authenticating the operation will be unsuccessful, the execution result may be transmitted to the client device to prevent execution of the operation. For instance, where the operation is related to providing access to one or more items available via an entity (e.g., a log in request associated with a computer), the log in request may be prevented from being executed (e.g., thereby preventing access to the one or more items). As another example, in the context of EMV chip cards, where the operation is a transaction (e.g., to purchase one or more items via a merchant), and the execution result has indicated that authenticating the operation will be unsuccessful (e.g., due to being a fraudulent transaction), the execution result may be transmitted to a PoS device to prevent execution of the transaction. In this way, network traffic may be reduced as the fraudulent transaction need not be processed by a remote authentication server to authorize the transaction. Rather, the transaction may be prevented from being executed at the PoS system, which reduced the amount of network traffic and increases the amount of valuable network bandwidth for other non-fraudulent transactions to be authorized via a remote authorization server. Operation 408 may be performed by a subsystem that is the same as or similar to communication subsystem 114, in accordance with one or more embodiments.

In some embodiments, the various computers and subsystems illustrated in FIG. 1 may include one or more computing devices that are programmed to perform the functions described herein. The computing devices may include one or more electronic storages (e.g., database(s) 132, which may include system data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, Wi-Fi, Bluetooth, NFC, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically store information. The storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method, the method comprising: receiving, from a client device, information for an operation comprising a message to authenticate the operation and a value associated with the operation; in response to the value satisfying a predetermined threshold value, obtaining a machine learning model trained on information regarding a plurality of historical operations and corresponding execution results, wherein the plurality of historical operations were executed on a client device of a same type as the client device; using the machine learning model, processing the information for the operation to predict an execution result for authenticating the operation; and in response to the execution result indicating that authenticating the operation will be unsuccessful, transmitting the execution result to the client device to prevent execution of the operation.
2. The method of the preceding embodiment, wherein obtaining the machine learning model trained on the information regarding the plurality of historical operations and the corresponding execution results comprises: receiving, from the client device, the information regarding the plurality of historical operations and the corresponding execution results; training the machine learning model using the information regarding the plurality of historical operations and the corresponding execution results to generate an updated machine learning model; and returning the updated machine learning model as the machine learning model.

3. The method of any of the preceding embodiments, wherein obtaining the machine learning model trained on the information regarding the plurality of historical operations and the corresponding execution results comprises obtaining the machine learning model from the client device or a remote device.

4. The method of any of the preceding embodiments, wherein the value associated with the operation is related to a level of network traffic.

5. The method of any of embodiments 1-3, wherein the value associated with the operation is related to a priority level for the operation.

6. The method of any of the preceding embodiments, further comprising: in response to the execution result indicating that authenticating the operation will be successful, transmitting a validation request to the client device to allow execution of the operation, wherein the validation request comprises (i) the execution result and (ii) an instruction to transmit the validation request to a third-party authorization source.

7. The method of any of the preceding embodiments, wherein transmitting the execution result to the client device to prevent execution of the operation is transmitted without transmitting a validation request indicating the execution result to a third-party authorization source.

8. The method of any of the preceding embodiments, wherein the information regarding the plurality of historical operations comprises a corresponding authentication instruction and priority value for each historical operation.

9. The method of any of the preceding embodiments, wherein the operation relates to providing access to one or more items available via an entity.

10. A tangible, non-transitory, machine-readable medium storing instructions that, when executed by a data processing apparatus, cause the data processing apparatus to perform operations comprising those of any of the foregoing method embodiments.

11. A system comprising: one or more processors; and memory storing instructions that, when executed by the processors, cause the processors to effectuate operations comprising those of any of the foregoing method embodiments.

What is claimed is:

1. A token for reducing network traffic related to network operations, comprising:
one or more processors executing computer program instructions that, when executed, cause operations comprising:
receiving, from a client device, information for an operation comprising an authentication instruction for the operation and a value indicative of a priority for the operation;
in response to the value satisfying a predetermined threshold value, obtaining information regarding a plurality of historical operations and corresponding execution results, wherein the information regarding the plurality of historical operations comprises a corresponding authentication instruction and priority value for each historical operation, wherein the plurality of historical operations were executed on a device of a same type as the client device;
training a machine learning model using the information regarding the plurality of historical operations and the corresponding execution results to generate an updated machine learning model;
using the updated machine learning model, processing the information for the operation to predict an execution result for the authentication instruction for the operation; and
in response to the execution result indicating that the authentication instruction will be unsuccessful, transmitting the execution result to the client device to prevent execution of the operation.

2. A method, comprising:
receiving, at a token, from a client device, information for an operation comprising a message to authenticate the operation and a value indicative of a priority of the operation;
in response to the value satisfying a predetermined threshold value, obtaining, at the token, a machine learning model trained on information regarding a plurality of historical operations and corresponding execution results, wherein the information regarding the plurality of historical operations comprises (i) a corresponding message to authenticate a historical operation and (ii) a value associated with the historical operation indicating a priority of the historical operation of the plurality of historical operations, and wherein the plurality of historical operations were executed on a device of a same type as the client device;
using the machine learning model, processing the information for the operation to predict an execution result for authenticating the operation; and
in response to the execution result indicating that authenticating the operation will be unsuccessful, transmitting, from the token, the execution result to the client device to prevent execution of the operation.

3. The method of claim 2, wherein obtaining the machine learning model trained on the information regarding the plurality of historical operations and the corresponding execution results comprises:
receiving, at the token, from the client device, the information regarding the plurality of historical operations and the corresponding execution results;
training the machine learning model using the information regarding the plurality of historical operations and the corresponding execution results to generate an updated machine learning model; and
returning the updated machine learning model as the machine learning model.

4. The method of claim 2, wherein obtaining the machine learning model trained on the information regarding the plurality of historical operations and the corresponding execution results comprises obtaining the machine learning model from the client device or a remote device.

5. The method of claim 2, wherein the value associated with the operation is related to a level of network traffic.

6. The method of claim 2, wherein the value associated with the operation is related to a priority level for the operation.

7. The method of claim 2, further comprising:
in response to the execution result indicating that authenticating the operation will be successful, transmitting a validation request, from the token, to the client device to allow execution of the operation, wherein the validation request comprises (i) the execution result and (ii) an instruction to transmit the validation request to a third-party authorization source.

8. The method of claim 2, wherein transmitting the execution result to the client device to prevent execution of the operation is transmitted without transmitting a validation request indicating the execution result to a third-party authorization source.

9. The method of claim 2, wherein the information regarding the plurality of historical operations comprises a corresponding authentication instruction and priority value for each historical operation.

10. The method of claim 2, wherein the operation relates to providing access to one or more items available via an entity.

11. One or more non-transitory computer-readable media comprising instructions that, when executed by one or more processors, cause operations comprising:
   receiving, at a token, from a client device, information for an operation comprising a message to authenticate the operation and a value indicative of a priority of the operation;
   in response to the value satisfying a predetermined threshold value, obtaining, at the token, a machine learning model trained on information regarding a plurality of historical operations and corresponding execution results, wherein the information regarding the plurality of historical operations comprises (i) a corresponding message to authenticate a historical operation and (ii) a value associated with the historical operation indicating a priority of the historical operation of the plurality of historical operations, and wherein the plurality of historical operations were executed on a device of a same type as the client device;
   using the machine learning model, processing the information for the operation to predict an execution result for authenticating the operation; and
   in response to the execution result indicating that authenticating the operation will be unsuccessful, transmitting, from the token, the execution result to the client device to prevent execution of the operation.

12. The one or more non-transitory computer-readable media of claim 11, wherein obtaining the machine learning model trained on the information regarding the plurality of historical operations and the corresponding execution results comprises:
   receiving, at the token, from the client device, the information regarding the plurality of historical operations and the corresponding execution results;
   training the machine learning model using the information regarding the plurality of historical operations and the corresponding execution results to generate an updated machine learning model; and
   returning the updated machine learning model as the machine learning model.

13. The one or more non-transitory computer-readable media of claim 11, wherein
   obtaining the machine learning model trained on the information regarding the plurality of historical operations and the corresponding execution results comprises obtaining the machine learning model from the client device or a remote device.

14. The one or more non-transitory computer-readable media of claim 11, wherein the value associated with the operation indicates a priority level of the operation.

15. The one or more non-transitory computer-readable media of claim 14, wherein obtaining the machine learning model further comprises obtaining the machine learning model in response to the priority level satisfying the predetermined threshold value.

16. The one or more non-transitory computer-readable media of claim 11, the operations further comprising:
   in response to the execution result indicating that authenticating the operation will be successful, transmitting, from the token, a validation request to the client device to allow execution of the operation, wherein the validation request comprises (i) the execution result and (ii) an instruction to transmit the validation request to a third-party authorization source.

17. The one or more non-transitory computer-readable media of claim 11, wherein transmitting the execution result to the client device to prevent execution of the operation is transmitted without transmitting a validation request indicating the execution result to a third-party authorization source.

18. The one or more non-transitory computer-readable media of claim 11, wherein the information regarding the plurality of historical operations comprises a corresponding authentication instruction and priority value for each historical operation.

19. The one or more non-transitory computer-readable media of claim 11, wherein the operation relates to providing access to one or more items available via an entity.

20. The one or more non-transitory computer-readable media of claim 11, wherein the machine learning model is an extreme gradient boosting model.

* * * * *